(12) United States Patent
Hadatsuki

(10) Patent No.: US 9,652,995 B2
(45) Date of Patent: May 16, 2017

(54) REWARD/PUNISHMENT-AND-CONTROL SYSTEM

(75) Inventor: Naomi Hadatsuki, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 13/045,353

(22) Filed: Mar. 10, 2011

(65) Prior Publication Data
US 2012/0231428 A1  Sep. 13, 2012

(51) Int. Cl.
*G09B 19/00* (2006.01)
*G09B 23/28* (2006.01)

(52) U.S. Cl.
CPC ............. *G09B 19/00* (2013.01); *G09B 23/28* (2013.01)

(58) Field of Classification Search
CPC ...................................................... G09B 23/28
USPC ........................................ 434/236; 705/2, 3
See application file for complete search history.

(56) References Cited

U.S. PATENT DOCUMENTS

| | | | |
|---|---|---|---|
| 4,615,681 A * | 10/1986 | Schwarz | 434/236 |
| 4,853,854 A * | 8/1989 | Behar et al. | 700/295 |
| 6,561,811 B2 * | 5/2003 | Rapoza et al. | 434/236 |
| 6,567,785 B2 * | 5/2003 | Clendenon | 705/7.42 |
| 7,028,693 B2 * | 4/2006 | Brue | 434/236 |
| 7,309,315 B2 * | 12/2007 | Kullok et al. | 600/558 |
| 8,272,875 B1 * | 9/2012 | Jurmain | 434/236 |
| 8,285,195 B2 * | 10/2012 | Etuk et al. | 434/350 |
| 8,473,342 B1 * | 6/2013 | Roberts | 705/14.35 |
| 2003/0036042 A1 * | 2/2003 | Hill | 434/236 |
| 2003/0059750 A1 * | 3/2003 | Bindler et al. | 434/236 |
| 2004/0115603 A1 * | 6/2004 | Reynolds | 434/236 |
| 2008/0097550 A1 * | 4/2008 | Dicks et al. | 607/59 |
| 2009/0076856 A1 * | 3/2009 | Darby et al. | 705/3 |
| 2010/0137693 A1 * | 6/2010 | Porras et al. | 600/301 |
| 2011/0123969 A1 * | 5/2011 | Boettcher et al. | 434/238 |
| 2013/0309641 A1 * | 11/2013 | Sawyer et al. | 434/236 |

OTHER PUBLICATIONS

U.S. Appl. No. 13/045,381, filed Mar. 10, 2011, Hadatsuki.

* cited by examiner

*Primary Examiner* — Nikolai A Gishnock
(74) *Attorney, Agent, or Firm* — Baker Botts L.L.P.

(57) ABSTRACT

In one embodiment, one or more first computing devices receive, from one or more second computing devices associated with a first person, information concerning an activity, the information describing the activity, a reward associated with the activity, and a condition of the reward; transmit, to one or more third computing devices associated with the second person, the information; receive, from the third computing devices, a first response by the second person; and if the first response is an acceptance to the activity by the second person, then: receive, from the third computing devices, first sensor data relating to the activity; analyze the first sensor data to determine whether the condition of the reward is satisfied; and if the condition of the reward is satisfied, then transmit, to the second computing devices and the third computing devices, a second notice indicating that the condition of the reward has been satisfied.

24 Claims, 7 Drawing Sheets

REWARD/PUNISHMENT-AND-CONTROL SYSTEM

TECHNICAL FIELD

This disclosure generally relates to a web-based system for encouraging users to perform desirable activities and discouraging users from performing undesirable activities.

BACKGROUND

There are certain activities that a person may not want to perform and yet are beneficial to the person. Conversely, there are certain activities that a person may wish to perform and yet are harmful to the person. For example, a person may not want to exercise on a regular basis because it is time consuming and physically demanding, and yet, regular exercise, in general, helps improve the person's physical as well as mental conditions. As another example, a person may wish to smoke, and yet, smoking is harmful to the person's physical health and may cause various diseases.

Sometimes, a person may be encouraged to perform a beneficial activity or discouraged from performing a harmful activity. Such examples may often be found in a parent-child relationship. The parent may wish to encourage the child to study and complete his homework before watching television or playing games. The parent may also wish to discourage the child from smoking, drinking alcohol, and staying out late.

DESCRIPTION OF EXAMPLE EMBODIMENTS

There are times when a first person (e.g., a parent) may wish to encourage a second person (e.g., a child) to perform a desirable activity (e.g., study, exercise). The encouragement may be necessary because the second person does not want to perform the desirable activity even though it may be beneficial to the second person. Similarly, there are times when a first person may wish to discourage a second person from performing an undesirable activity (e.g., drinking alcohol, speeding, smoking)). The discouragement may be necessary because the second person wants to perform the undesirable activity even though it may be harmful to the second person. For clarification purposes, in this disclosure, the first person (i.e., the person who encourages or discourages) is referred to as a "controller"; and the second person (i.e., the person being encouraged or discouraged) is referred to as an "actor".

Figure 1:
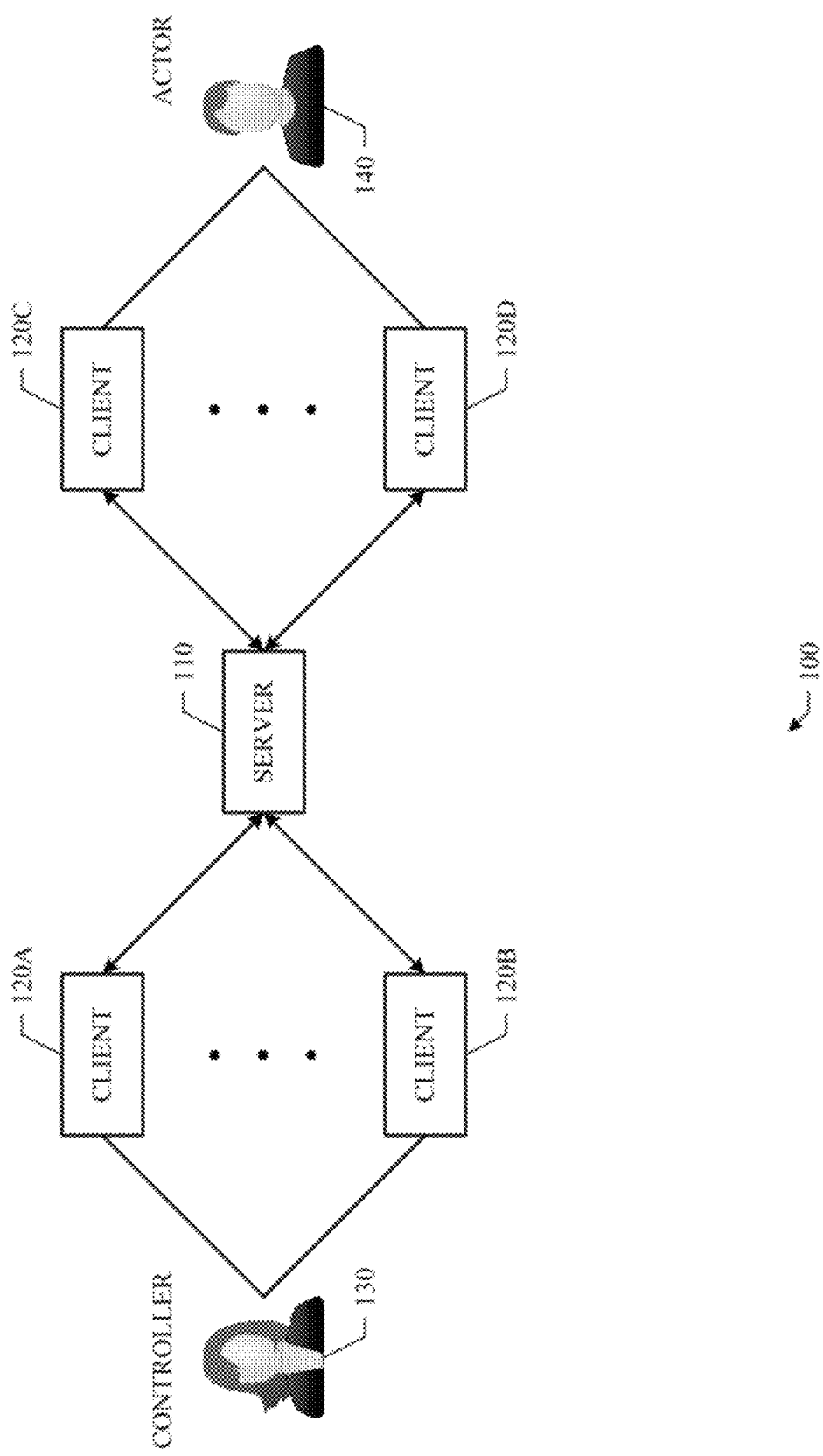
FIG. 1 illustrates an example system for encouraging users to perform desirable activities and discouraging users from performing undesirable activities.

FIG. 1 illustrates an example system 100 for encouraging users (i.e., actors) to perform desirable activities and discouraging users (i.e., actors) from performing undesirable activities. In particular embodiments, system 100 is a client-server system, which may include any number of computing devices (e.g., server 110, client 120) connected to a computer network (e.g., the Internet). In particular embodiments, a web-based software application is hosted (e.g., resides and executes) on server 110 and may be accessed by any client 120 through the computer network using one or more suitable communication protocols (e.g., Hypertext Transfer Protocol, or HTTP).

In particular embodiments, a controller 130 may be associated with and use any number of clients 120 (e.g., clients 120A, 120B) to access the web-based application hosted on server 110. Similarly, in particular embodiments, an actor 140 may be associated with and use any number of clients 120 (e.g., clients 120C, 120D) to access the web-based application hosted on server 110. For example, when actor 140 is at home, actor 140 may use a desktop computer to access server 110. But when actor 140 is out (e.g., at a park or a movie theater), actor 140 may use a smart phone to access server 110.

In particular embodiments, each client 120, and more specifically, each client 120 used by actor 140 (e.g., clients 120C, 120D), may include one or more types of sensors for detecting various types of information, such as, for example and without limitation, Global Positioning System (GPS) coordinates (e.g., detected by a GPS sensor), motion (e.g., detected by an accelerometer), orientation (e.g., detected by a gyroscope), bar code (e.g., detected by a bar code reader or a camera with supporting software), image recognition, facial recognition (e.g., detected by a camera with supporting software), temperature (e.g., detected by a thermometer), humidity, light, calorie burned, body fat, audio volume (e.g., detected by a microphone), breathing, heart or pulse rate (e.g., detected by a heart rate monitor), or blood alcohol content (e.g., detected by a breathalyzer). Different clients 120 may include different types of sensors, and this disclosure contemplates any suitable types of sensors. In particular embodiments, the information detected by specific sensors may be analyzed to infer what actor 140 does or where actor 140 is at a given time or over a period of time.

Figure 2A:
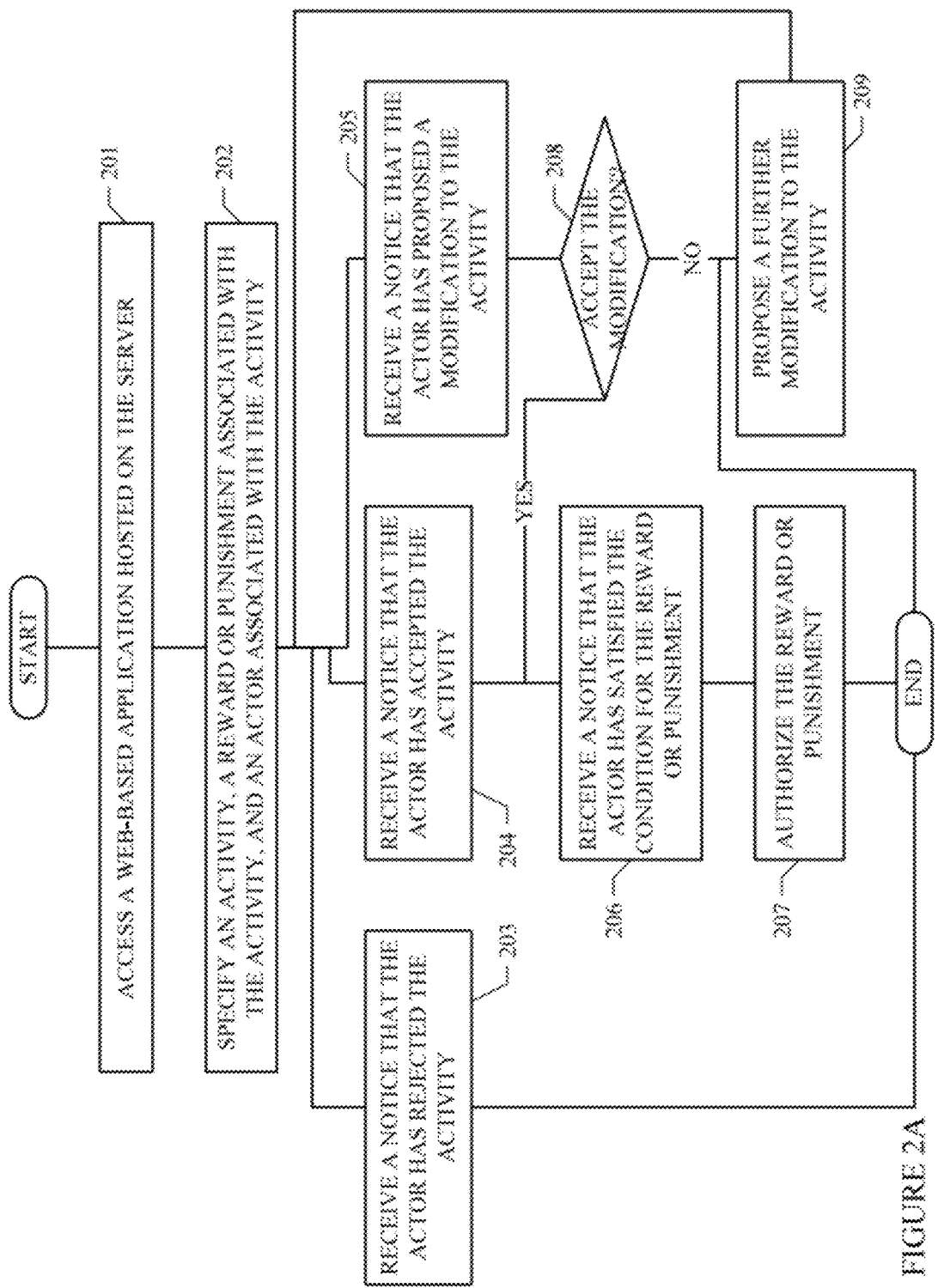
FIGS. 2A-2C illustrate an example method for encouraging users to perform desirable activities and discouraging users from performing undesirable activities.
Figures 1, 2D:
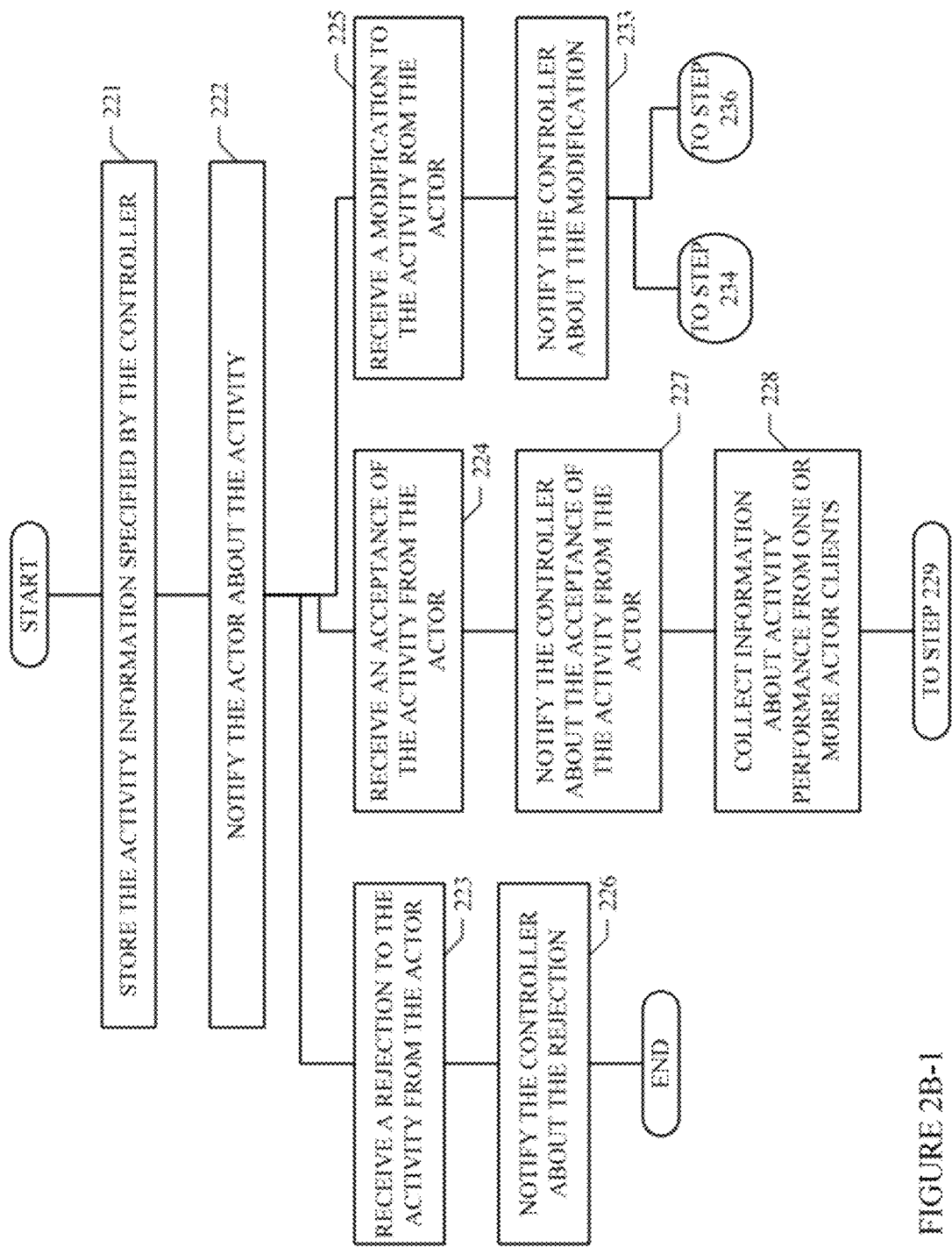
Figures 2, 2B:
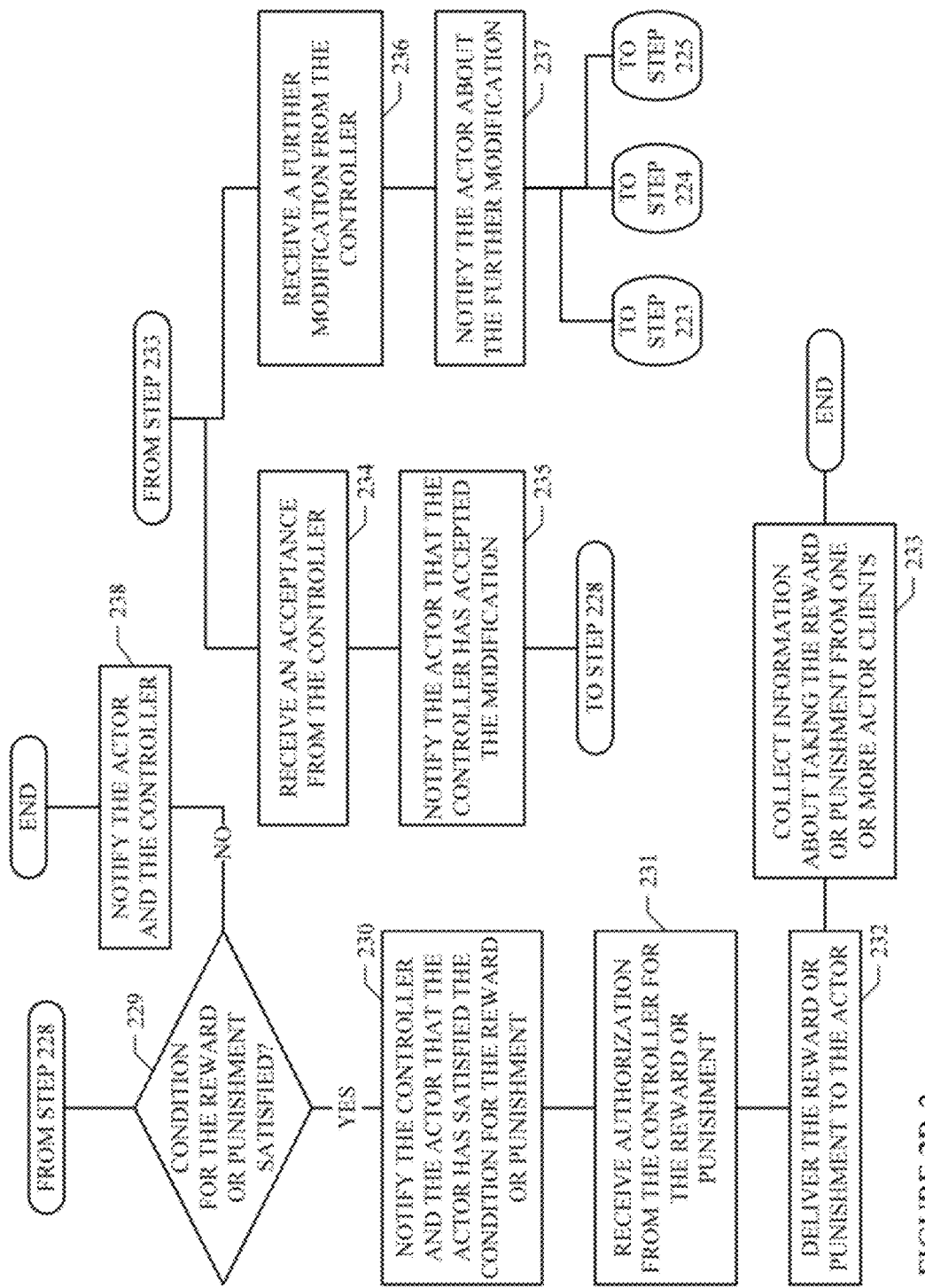
Figure 2C:
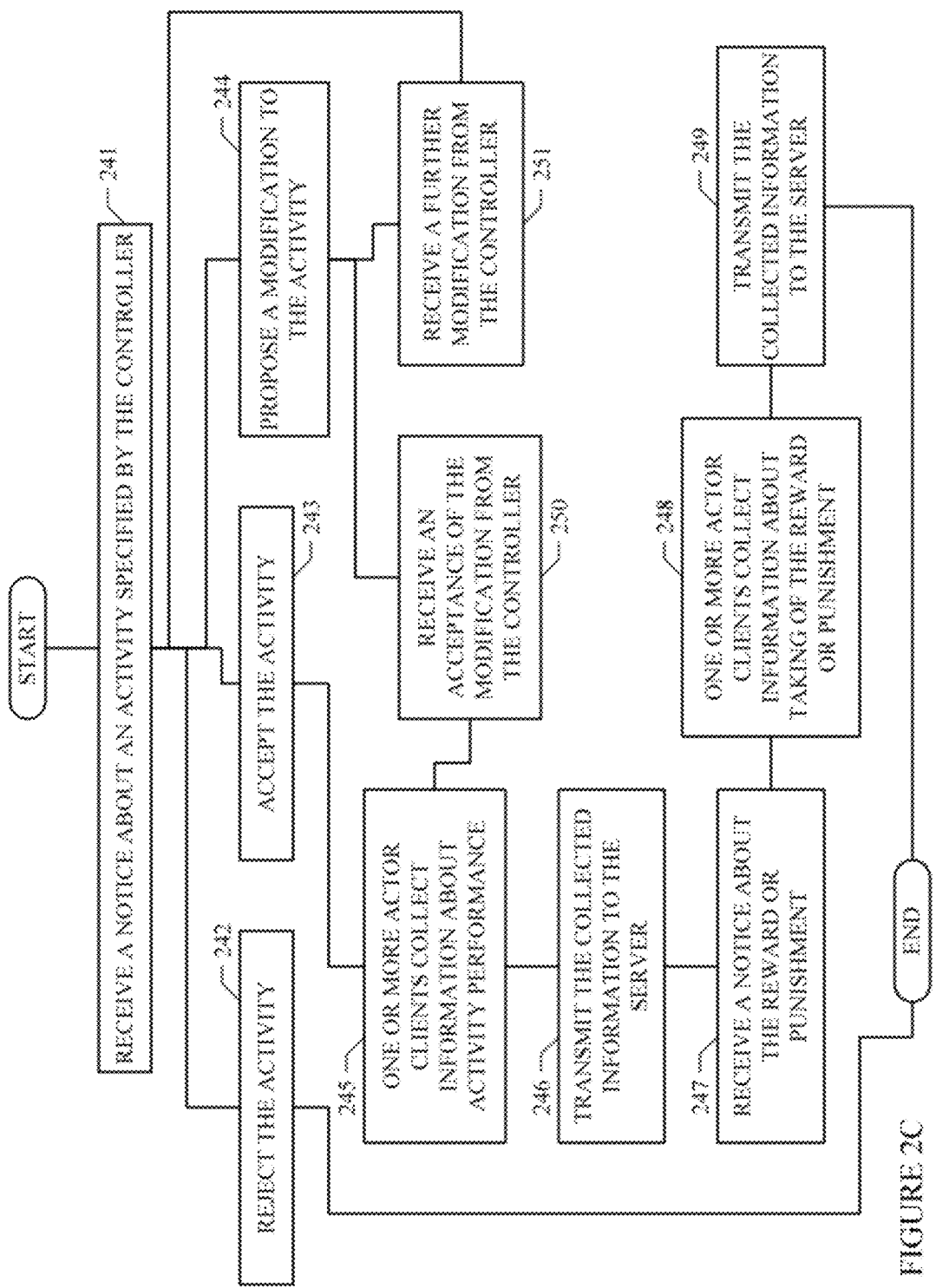

FIG. 2 illustrates an example method for encouraging users to perform desirable activities and discouraging users from performing undesirable activities. FIG. 2 is divided into three parts: FIGS. 2A, 2B, and 2C. In particular embodiments, the steps illustrated in FIG. 2A may be performed by a client associated with a controller (e.g., clients 120A or 120B illustrated in FIG. 1; hereafter referred to as a "controller client); the steps illustrated in FIG. 2B may be performed by a server (e.g., server 110); and the steps illustrated in FIG. 2C may be performed by a client associated with an actor (e.g., clients 120C or 120D illustrated in FIG. 1; hereafter referred to as an "actor client). There may be interactions between the controller client and the server, or between the actor client and the server. Furthermore, those steps performed by a controller client may be performed by any one of the clients associated with the controller (e.g., one step may be performed by a first client associated with the controller; and another step may be performed by a second client associated with the controller). Similarly, those steps performed by an actor client may be performed by any one of the clients associated with the actor (e.g., one step may be performed by a first client associated with the actor; and another step may be performed by a second client associated with the actor).

In particular embodiments, a controller (e.g., a parent) may access a web-based application hosted on the server using a controller client, as illustrated in STEP 201 of FIG. 2A. In particular embodiments, the web-based application may have a unique Uniform Resource Identifier (URI) or more specifically, a Uniform Resource Locator (URL). Each user of the web-based application may access the application through a web browser executing on a client device (e.g., by inputting the URL of the web-based application in the web browser). In particular embodiments, the web-based application may provide a user interface in the form of a set of web pages, which may be displayed in a web browser. Through these web pages, a user may interact with the web-based application. In particular embodiments, each user of the web-based application (e.g., the controller and the actor) may register with the web-based application to obtain a user account, and each user account may be associated with a username and a password. When accessing the web-based application, each user may log into his account using his username and password.

In particular embodiments, the controller may specify an activity, a reward or a punishment associated with the activity, and an actor (e.g., a child) associated with the activity, as illustrated in STEP 202 of FIG. 2A. The activity may be a desirable activity that the controller wishes the actor to perform, or an undesirable activity that the controller wants to prevent the actor from performing. If the activity is a desirable activity, then a reward may be associated with performing the activity. In addition or alternatively, a punishment may be associated with not performing the activity. Similarly, if the activity is an undesirable activity, then a reward may be associated with not performing the activity. In addition or alternatively, a punishment may be associated with performing the activity. Thus, an activity may be associated with a reward or a punishment or both. The actor is the person who should perform the desired activity or refrain from performing the undesired activity. The actor may receive the reward or the punishment depending on whether he performs the activity.

In particular embodiments, if a reward is specified for the activity, the controller may specify the condition (hereafter referred to as "reward condition") that should be satisfied before the actor receives the reward. Similarly, if a punishment is specified for the activity, the controller may specify the condition (hereafter referred to as "punishment condition") that should be satisfied before the actor receives the punishment. The reward or punishment condition may include any number of requirements. For example, for a school study activity, one reward requirement may be the minimum number of hours the actor must study each weekday (e.g., 3 hours); another reward requirement may be the hour of the day before which the actor must complete his homework each weekday (e.g., before 8:00 pm); and a third requirement may be the duration of the activity (e.g., a semester). In particular embodiments, the controller may specify how many of the requirements need to be met before the condition is considered satisfied (e.g., all requirements, or 80% of the requirements, or all critical requirements). In particular embodiments, there may be multiple levels of reward or punishment associated with the activity. For example, if 100% of the requirements are met, the actor may receive a bigger reward. However, if only 80% of the requirements are met, the actor may receive a smaller reward.

In particular embodiments, when specifying an activity, the controller may specify any suitable activity and associate any suitable reward or punishment and reward or punishment condition with the activity. For example, a reward may be a specific amount of money, a gift item (e.g., a game of a gaming system such as an XBOX), an entertainment event (e.g., a trip to an amusement park), or a number of points that may be accumulated over time in connection with multiple activities and redeemed for bigger reward prices. In addition, a reward may include a bonus for extra performance. This disclosure contemplates any applicable reward or punishment methods.

In particular embodiments, there may be a predefined set of activities with associated rewards or punishments provided by the web-based application. In particular embodiments, the predefined set of activities with the associated rewards or punishments may be specified by the controllers, the actors, the application hosted on the server for managing the reward/punishment system, or a third party (e.g., game vendor, educational material vendor, game developer, e-commerce vendor, and so on). The controller may select any activity from this predefined set. In addition, the controller may customize a predefined activity by modifying any aspect of the predefined activity (e.g., the reward or punishment associated with the activity, or reward condition, or the punishment condition).

In particular embodiments, once the controller has provided the information associated with the activity, which may include the activity to be performed or not performed, the reward or punishment associated with the activity, the reward or punishment condition, and the actor to perform or not perform the activity, the web-based application may store the activity information in a storage accessible to the server, and thus to the web-based application, as illustrated in STEP 221 of FIG. 2B. The activity information may be stored in connection with the controller's user account so that the controller may review and modify any part of the activity information at any time by logging into his account. In addition, in particular embodiments, the actor identified with the activity may be granted permission to review the activity information.

In particular embodiments, the actor identified with the activity may be notified about the activity, as illustrated in STEP 222 of FIG. 2B and STEP 241 of FIG. 2C. For example, an email or an instant message may be sent to the actor, notifying the actor that there is an activity with which he is identified. The actor may then log into his own account to review more detailed information about the activity. In particular embodiments, the actor may receive information such as what specific activity is to be performed or not performed, what reward or punishment is associated with the activity, what reward or punishment condition needs to be satisfied. In some cases (e.g., as specified by the controller), the actual reward or punishment associated with the activity may be hidden from the actor so that it becomes a "surprise" reward or punishment. In other cases (e.g., again as specified by the controller), there may be a list of rewards or punishments associated with the activity from which the actor may select a specific reward or punishment if the actor decides to accept the activity.

Upon reviewing the activity information, in particular embodiments, the actor may have three choices in response. As the first choice, the actor may reject the activity, as illustrated in STEP 223 of FIG. 2B and STEP 242 of FIG. 2C. This indicates that the actor refuses to get involved with the activity. In particular embodiments, the controller may be notified that the actor has rejected the activity, as illustrated in STEP 203 of FIG. 2A and STEP 226 of FIG. 2B. The controller has various options at this point. For example, the controller may specify a different activity in connection with the same actor, modify the current activity (e.g., reward or punishment, reward or punishment condition), have a discussion with the actor, or do nothing.

As the second choice, the actor may accept the activity, as illustrated in STEP 224 of FIG. 2B and STEP 243 of FIG. 2C. This indicates that the actor agrees to perform or not perform the activity and accepts all the criteria (e.g., reward or punishment, reward or punishment condition) associated with the activity. In particular embodiments, by accepting the activity, the actor and the controller have entered into an agreement that the actor agrees to perform or not perform the activity as specified by the controller and take the associated punishment, if any, if the punishment condition is met; and the controller agrees to deliver the associated reward, if any, if the actor satisfies the reward condition. In particular embodiments, the controller may be notified that the actor has accepted the activity, as illustrated in STEP 204 of FIG. 2A and STEP 227 of FIG. 2B.

In particular embodiments, as the actor performs or not performs the activity (e.g., exercise, study, or not smoke), as specified by the controller, one or more actor clients may collection information about the activity performance, as illustrated in STEP 245 of FIG. 2C. As described above, the actor may be associated with any number of client devices, and each actor client may include different types of sensors for detecting various types of information. These sensors may collect the relevant information with respect to the activity performance. In particular embodiments, each actor client may transmit the collected sensor data to the server for processing, as illustrated in STEP 228 of FIG. 2B and STEP 246 of FIG. 2C.

For example, suppose the activity, as specified by the controller, is that the actor exercises at least one hour per day. In this case, the actor may carry an actor client, when exercising, that has sensors for measuring the heart rate, speed, calories burned, or other suitable physical conditions of the actor. The actor client may send the collected sensor data to the server so that the sensor data may be processed to determine whether the actor has exercised each day and for how long. For example, when the actor exercises, the actor's hear rate naturally increases. Thus, from the heart rate sensor data, the server may determine whether the actor's hear rate increases significantly during a period of time each day and for long.

As another example, suppose the activity, as specified by the controller, is that the actor studies at least two hours per day. In this case, the actor client (e.g., a computer) that the actor uses to study may have a timer or a tracking sensor that collects information such as how long the actor uses the computer each day and what actives the actors performs with the computer (e.g., writing a school paper, researching on a school assignment). The computer may send the collected sensor data to the server so that the sensor data may be processed to determine whether the actor has studied each day and for how long.

As a third example, suppose the activity, as specified by the controller, is that the actor refrains from smoking. In this case, the actor may carry a smoke detector (e.g., incorporated as a part of the actor client). If the actor smokes, the smoke detector may detect the smoke and send an alert to the server so that the server is notified whenever the actor smokes. As a fourth example, suppose the activity, as specified by the controller, is that the actor refrains from staying out late at night (e.g., after 10:00 pm). In this case, the actor may carry a GPS device (e.g., incorporated as a part of the actor's mobile phone). The GPS device may track the actor's location at any given time. If the GPS coordinates indicate that the actor is outside of the home late at night, the mobile phone may send an alter to the server.

In particular embodiments, the actor may be associated with multiple actor clients. For example, when the actor exercises, the actor may carry one actor client on one day and another actor client on another day. In particular embodiments, each actor client sends the sensor data it has collected to the server for processing. The server may aggregate all the sensor data collected by the multiple actor clients associated with the actor, as illustrated in STEP 228 of FIG. 2B. As a result, the actor is not restricted to use only one actor client at all times, but has the freedom of using any available or convenient actor client in connection with the activity.

In particular embodiments, based on the aggregated sensor data received from one or more actor clients, the server may determine whether the reward or punishment condition, as specified by the controller, has been satisfied, as illustrated in STEP 229 of FIG. 2B. In the above "daily exercise" example, suppose that the controller has specified that the actor receives a reward if the actor exercises at least one hour per day for a month. In this case, the server may analyze the sensor data relating to the actor's physical conditions (e.g., heart rate, speed, calories burned) collected by the actor clients for a month. If the aggregated sensor data indicate that the actor has indeed exercised each day for at least an hour during the month, then the reward condition is satisfied. Otherwise, the reward condition is not satisfied. In the above "smoking" example, suppose that the controller has specified that the actor receives a reward if the actor refrains from smoking for a month or a punishment is the actor smokes more than 3 times during the month. In this case, the server may collect the smoking alerts received from the actor clients during a month. If no smoking alert has been received during the month, then the reward condition is satisfied. If more than 3 smoking alerts have been received during the month, then the punishment condition is satisfied.

In particular embodiments, while the actor is performing or refraining from performing the activity, the actor and the controller may monitor the actor's progress in real time. In particular embodiments, the server receives and collects sensor data relating to the actor's performing or refraining from performing the activity from the actor clients. At any given time, the server may analyze the sensor data thus far collected to determine the current status or process of the actor's performance with respect to the activity. The controller and the actor may each log into his own account to view the actor's progress whenever needed. For example, the progress may be represented as a progress bar, a chart, or other suitable representations.

In particular embodiments, if there is a reward associated with the activity but the actor has not satisfied the reward condition, or if there is a punishment associated with the activity but the actor has not satisfied the condition (STEP 229 of FIG. 2B—"NO"), the server may notify the controller and the actor (e.g., through the controller clients and actor clients respectively) that the reward or punishment condition has not bee satisfied, as illustrated in STEP 238 of FIG. 2B. On the other hand, in particular embodiments, if there is a reward associated with the activity and the actor has satisfied the reward condition, or if there is a punishment associated with the activity and the actor has satisfied the condition (STEP 229 of FIG. 2B—"YES"), the server may notify the controller and the actor (e.g., through the controller clients and actor clients respectively) that the reward or punishment condition has been satisfied, as illustrated in STEP 206 of FIG. 2A and STEP 230 of FIG. 2B and STEP 247 of FIG. 2C.

When the reward or punishment condition has been satisfied, in particular embodiments, the server may deliver the reward or punishment to the actor automatically, as specified by the controller. Alternatively, in particular embodiments, the controller may have specified that a controller authorization needs to be obtained before the reward or punishment is delivered to the actor. In this case, the server may request an authorization from the controller regarding the reward or punishment. In particular embodiments, the controller may authorize the reward or punishment using a controller client (e.g., by logging into his account and submit the authorization), as illustrated in STEP 207 of FIG. 2A and STEP 231 of FIG. 2B.

In particular embodiments, once the authorization has been received, the server may deliver the reward or punishment to the actor, as illustrated in STEP 232 of FIG. 2B. The method of delivery may depend on the nature of the reward or punishment. For example, with a point system, if the reward is a number of points, the server may credit the actor's account with the appreciate number of points. Conversely, if the punishment is a number of points, the server may deduct the actor's account with the appreciate number of points. As another example, if the reward is a number of hours that the actor may play computer games, the server may credit the number of hours to the actor's account. Conversely, if the punishment is that the actor cannot play video games for a week, the information may be stored in the actor's account.

In particular embodiments, the one or more actor clients may collect sensor data relating to the actor's taking the reward or punishment, as illustrated in STEP 248 of FIG. 2C and transmit the collected sensor data to the server, as illustrated in STEP 233 of FIG. 2B and STEP 249 of FIG. 2C. In particular embodiments, the server may analyze the sensor data to determine whether the actor has completely consumed the reward to taken the punishment.

In the above "video game" example, suppose that the actor has earned a reward of 10 hours of computer game playing time. The actor client (e.g., a game console) may monitor the amount of time the actor actually plays with the game console and send the collected timing data to the server. The server may track the total amount of time the actor has played using the console. When the actor has played 10 hours of video games on the console, the server may notify the controller and the actor that the actor has used up all the reward time. At this point, the controller may choose to, for example, take the game control away from the actor until the actor earns more playing time. Alternatively, the game control may be locked up so that the actor cannot play any more games until he earns more playing time as reward. Conversely, suppose that the actor has received a punishment that the actor cannot play vide games for a week. The game console may monitor the time the actor plays on the console and send an alert to the server each time the actor attempts to play video games on the console. The server may notify the controller and the actor that the actor has violated the punishment rule. In addition, the game console may be locked up for a week so that the actor does not have access to it during the week. Thus, in particular embodiments, the actor clients may collect sensor data relating to the actor's taking the reward or punishment, when appropriate, and transmit the collected sensor data to the server. The server may aggregate and analyze the sensor data received from the actor clients to determine whether the actor takes the reward or punishment according to the terms specified by the controller. In particular embodiments, when the actor has consumed the available reward, the actor clients may be set to prevent the actor from consuming any more reward until the actor earns more reward.

In particular embodiments, while the actor is taking his reward or punishment, the actor and the controller may monitor the actor's progress in real time. In particular embodiments, the server receives and collects sensor data relating to the actor's taking the reward or punishment from the actor clients. At any given time, the server may analyze the sensor data thus far collected to determine the current status or process of the actor's taking the reward or punishment. The controller and the actor may each log into his own account to view the actor's progress whenever needed. For example, the progress may be represented as a progress bar, a chart, or other suitable representations.

In particular embodiments, after the actor has accepted the activity and while the actor is performing or refraining from performing the activity, the actor may wish to modify the terms of the activity, which may include the activity itself, the reward or punishment, the reward or punishment condition, or the duration of the activity. For example, the actor may find it too difficult to satisfy the reward condition while performing the activity and consequently, may wish to modify the reward condition. In particular embodiments, the actor may propose the modification to the controller (e.g., by communicating the modification to the controller through the server). In particular embodiments, the actor and the controller may negotiate the specific terms of the activity with the help of the server, similar to the negotiation process described below. If the actor and the controller are able to come to an agreement, the actor may resume performing or refraining from performing the activity. In this case, the modified terms of the activity may take effect, replacing the original terms of the activity.

As the third choice, upon receiving the activity information, the actor may propose a modification to one or more parts of the activity, as illustrated in STEP 225 of FIG. 2B and STEP 244 of FIG. 2C. The modification may be with respect to any part of the activity setting, such as the activity itself, the actual reward or punishment, the reward or punishment condition, or the duration of the activity. In particular embodiments, the server may notify the controller of the actor's proposed modification, as illustrated in STEP 205 of FIG. 2A and STEP 233 of FIG. 2B.

Upon receiving the proposed modification from the actor, in particular embodiments, the controller has two choices, as illustrated in STEP 208 of FIG. 2A. The controller may accept the proposed modification as it is (STEP 208 of FIG. 2A—"YES") or not accept the proposed modification (STEP 208 of FIG. 2A—"NO"). If the controller accepts the proposed modification (STEP 208 of FIG. 2A—"YES"), this indicates that the controller agrees to the changes suggested by the actor (e.g., to the activity, the reward or punishment, or the reward or punishment condition). In particular embodiments, by accepting the modification proposed by the actor, the actor and the controller have entered into an agreement that the actor agrees to perform or not perform the activity and take the associated punishment, if any, if the punishment condition is met; and the controller agrees to deliver the associated reward, if any, if the actor satisfies the reward condition. The terms of the agreement incorporate the modification proposed by the actor. In particular embodiments, the controller may submit his acceptance to the modification to the sever, as illustrated in STEP 234 of FIG. 2B. The server may in turn notify the actor that the controller has accepted his proposed modification, as illustrated in STEP 235 of FIG. 2B and STEP 250 of FIG. 2C. In particular embodiments, once an agreement has been established between the controller and the actor regarding the activity, the actor may begin performing or refraining from performing the specified activity, as the process continues with STEP 206 of FIG. 2A and STEP 228 of FIG. 2B and STEP 245 of FIG. 2C, all of which are described above.

On the other hand, if the controller does not accept the proposed modification from the actor (STEP 208 of FIG. 2A—"NO"), the controller may indicate his rejection to the actor's modification and take no more action with respect to this specific activity, or alternatively, the controller may propose a further modification in response to the actor's modification proposal, as illustrated in STEP 207 of FIG. 2A, and submit the further modification to the server, as illustrated in STEP 236 of FIG. 2B. In particular embodiments, the server may notify the actor about the further modification proposed by the controller, as illustrated in STEP 237 of FIG. 2B and STEP 251 of FIG. 2C. At this point, the actor again has three choices. The actor may: (1) accept the activity with all the modifications thus far, (2) reject the activity, or (3) propose yet further modification to the activity. In particular embodiments, the negotiation between the controller and the actor with respect to the specific terms of the activity may continue until either party gives the final acceptance or rejection.

In particular embodiments, the controller and the actor may communicate with each other (e.g., proposing an activity, proposing a modification to the activity, accepting or rejecting the activity) via their respective client devices and the server. In particular embodiments, the controller and the actor may log into their respective accounts and communicate with each other and manage their activities and rewards or punishments through their user accounts (e.g., using the web-based user interface provided by the service).

In particular embodiments, the reward/punishment-and-control system described above may be incorporated with other types of services or systems. In particular embodiments, activities to be performed by an actor may be incorporated in the actor's electronic calendar so that the actor may receive reminders to perform the activity.

In particular embodiments, the controller or actor may link his account with the reward/punishment-and-control system with his social-networking account to share information with his social connections. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc. In particular embodiments, a reward/punishment-and-control system may partner up with a social-networking system so that their users' accounts at the two systems may be linked. The social-networking system may implement some functions in support of the reward/punishment-and-control system.

In particular embodiments, the controller (e.g., a parent) may share success stories on how to encourage his child to study with other parents he knows from the social-network system. Other users of the social-networking system may rate (e.g., like or dislike or a star rating) or comment (e.g., blogs or tweets) on the activates, the rewards or punishments, or the reward or punishment conditions. In particular embodiments, the controller and actor may communicate with other controllers and actors who are also members of the social-networking system via social-networking functions provided by, for example, the social-networking website implementing the social-networking system. Such communications may include, but not limited to, sharing or exchanging ideas (e.g., ideas on rewards or punishments), rating or commenting on the activates, the rewards or punishments, or the reward or punishment conditions. In particular embodiments, the controllers and the actors may compare their activities, rewards, and/or punishments with other users of the reward/punishment-and-control system and/or the social-networking system.

In particular embodiments, the reward/punishment-and-control system and/or the social-networking system may enable its users to play online games with other users. User may create teams for play these games. The controller and actors may join specific teams as team members and contribute to these teams. For example, an actor's reward may be a number of points added to the score of the team to which the actor belongs. Conversely, the actor's punishment may be a number of points subtracted from the score of the team to which the actor belongs. For example, the controllers and actors may join a team for "US vs. Japan for walking distance competition" (e.g., the distance may be measured using pedometers), or participate in "Math quiz for 5th grader competition" if such games already exist. As another example, the controllers and actors may create new groups or competitions and let others join the teams to participate.

Figure 3:
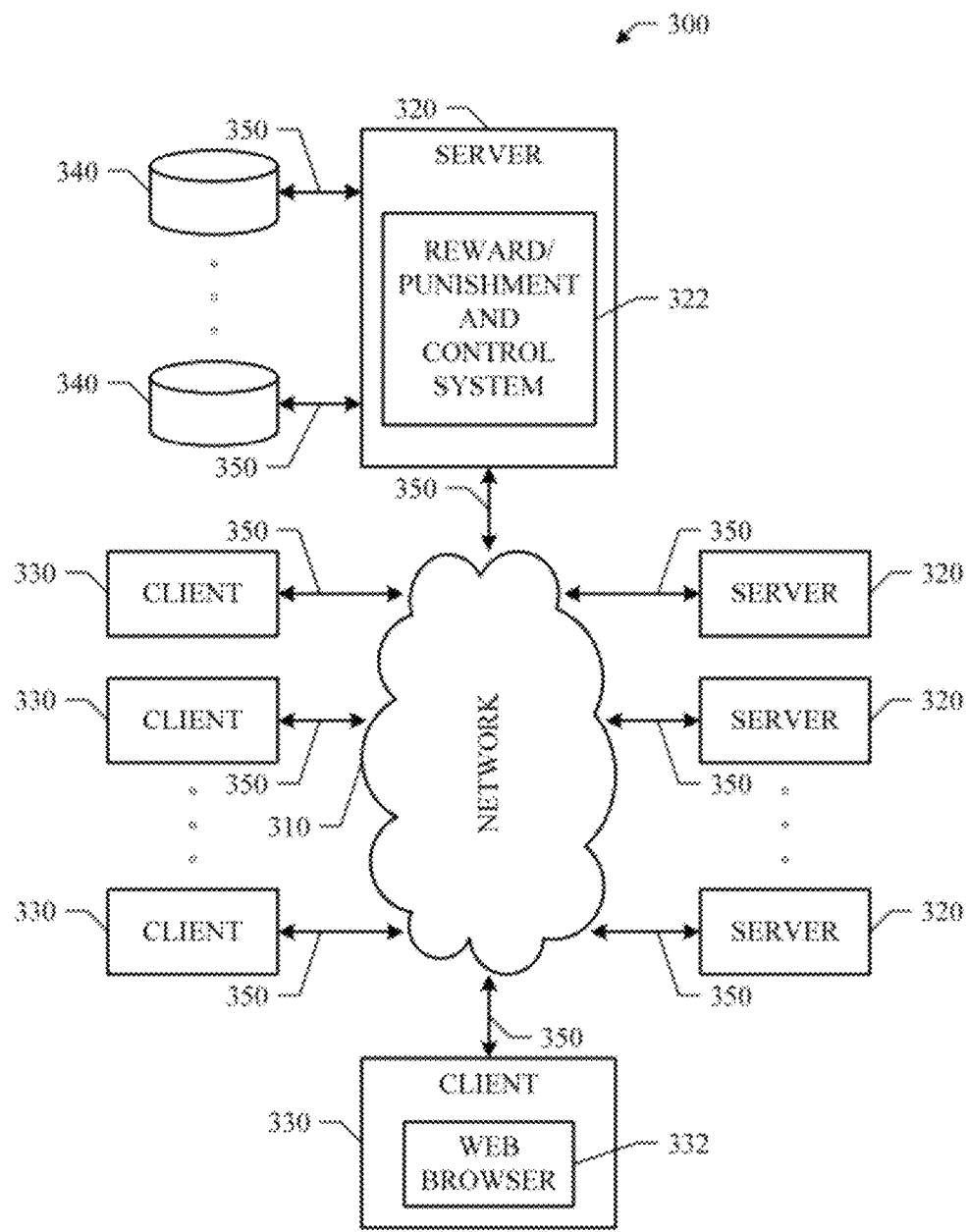
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a portion of the Internet, or another network 310 or a combination of two or more such networks 310. This disclosure contemplates any suitable network 310.

One or more links 350 couple a server 320 or a client 330 to network 310. In particular embodiments, one or more links 350 each includes one or more wireline, wireless, or optical links 350. In particular embodiments, one or more links 350 each includes an intranet, an extranet, a VPN, a LAN, a WLAN, a WAN, a MAN, a portion of the Internet, or another link 350 or a combination of two or more such links 350. This disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores. In particular embodiments, a reward/punishment-and-control system 322, implemented as a web-based application, may be hosted on one or more servers 320.

In particular embodiments, one or more data storages 340 may be communicatively linked to one or more severs 320 via one or more links 350. In particular embodiments, data storages 340 may be used to store various types of information. In particular embodiments, the information stored in data storages 340 may be organized according to specific data structures. In particular embodiments, each data storage 340 may be a relational database. Particular embodiments may provide interfaces that enable servers 320 or clients 330 to manage, e.g., retrieve, modify, add, or delete, the information stored in data storage 340.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. This disclosure contemplates any suitable clients 330. A client 330 may enable a network user at client 330 to access network 330. A client 330 may enable its user to communicate with other users at other clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT language, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 4:
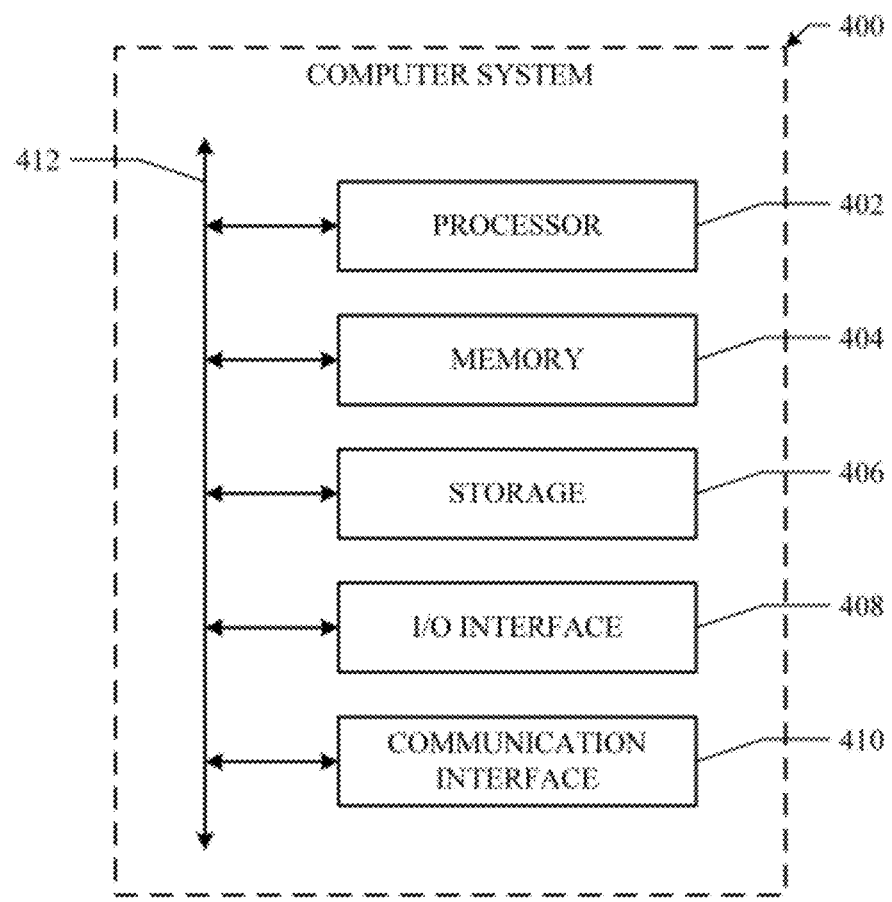
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a MICRO CHANNEL ARCHITECTURE (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a card made by SECURE DIGITAL, a drive made by SECURE DIGITAL, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, executed by a first computing device, comprising:
   receiving, from a second computing device associated with a first person, information specified by the first person concerning an activity, the information describing the activity, a reward associated with the activity, a condition of the reward, and a second person associated with the activity;
   transmitting, to a third computing device associated with the second person, the information concerning the activity;
   receiving, from the third computing device, a first response to the activity by the second person;
   determining whether the first response is an acceptance to the activity by the second person; and
   based on a determination that the first response is an acceptance to the activity by the second person:
      transmitting, to the second computing device, a first notice indicating that the second person has accepted the activity;
      determining one or more physical conditions of the second person using one or more sensor means on the third computing device, the one or more physical conditions of the second person represented in first sensor data relating to the activity;
      analyzing the first sensor data to determine whether the condition of the reward is satisfied, where the condition of the reward is a specific amount of exercise indicated by the one or more physical conditions; and
      based on a determination that the condition of the reward is satisfied:
         transmitting, to the second computing device and the third computing device, a second notice indicating that the condition of the reward has been satisfied;
         receiving, from the third computing device, second sensor data relating to the reward, where the reward is a specified amount of game playing time and the second sensor data indicates a portion of the specified amount that has been used;
         analyzing the second sensor data to determine whether the reward is consumed; and
         based on a determination that the reward is consumed, transmitting, to the second computing device and the third computing device, a third notice indicating that the reward has been consumed.

2. The method of claim 1, further comprising:
based on the determinations that the first response is an acceptance to the activity by the second person and that the condition of the reward is satisfied:
  receiving, from the second computing device, an authorization to the reward by the first person; and
  transmitting, to the third computing device, a third notice indicating that the reward has been authorized.

3. The method of claim 1, further comprising:
determining whether the first response is a first modification to the activity by the second person;
based on a determination that the first response is a first modification to the activity by the second person:
  transmitting, to the second computing device, the first modification;
  receiving, from the second computing device, a second response to the first modification by the first person;
  determining whether the second response is an acceptance to the first modification by the first person; and
  based on a determination that the second response is an acceptance to the first modification by the first person:
  transmitting, to the third computing device, a third notice indicating that the first person has accepted the first modification;
  receiving, from the third computing device, the first sensor data relating to the activity;
  analyzing the first sensor data to determine whether the condition of the reward is satisfied; and
  based on a determination that the condition of the reward is satisfied, transmitting, to the second computing device and the third computing device, the second notice indicating that the condition of the reward has been satisfied.

4. The method of claim 1, further comprising:
determining whether the first response is a first modification to the activity by the second person;
based on a determination that the first response is a first modification to the activity by the second person:
  transmitting, to the second computing device, the first modification;
  receiving, from the second computing device, a second response to the first modification by the first person;
  determining whether the second response is a second modification to the first modification by the first person; and
  based on the determination that the second response is a second modification to the first modification by the first person, transmitting, to the third computing device, the second modification.

5. The method of claim 1, further comprising:
determining whether the first response is a first modification to the activity by the second person;
based on a determination that the first response is a first modification to the activity by the second person:
  transmitting, to the second computing device, the first modification;
  receiving, from the second computing device, a second response to the first modification by the first person;
  determining whether the second response is a rejection to the first modification by the first person; and
  based on a determination that the second response is a rejection to the first modification by the first person, transmitting, to the third computing device, a third notice indicating that the first person has rejected the first modification.

6. The method of claim 1, further comprising:
determining whether the first response is a rejection to the activity by the second person; and
based upon a determination that the first response is a rejection to the activity by the second person, transmitting, to the second computing device, a third notice indicating that the second person has rejected the activity.

7. The method of claim 1, wherein the information concerning the activity further describes a punishment associated with the activity and a condition of the punishment.

8. The method of claim 7, further comprising:
based on the determination that the first response is an acceptance to the activity by the second person:
  analyzing the first sensor data to determine whether the condition of the punishment is satisfied; and
  based on a determination that the condition of the punishment is satisfied, transmitting, to the second computing device and the third computing device, a third notice indicating that the condition of the punishment has been satisfied.

9. A first system comprising:
a memory comprising instructions executable by a processor; and
the processor coupled to the memory and operable to execute the instructions, the processor being operable when executing the instructions to:
  receive, from a second system associated with a first person, information specified by the first person concerning an activity, the information describing the activity, a reward associated with the activity, a condition of the reward, and a second person associated with the activity;
  transmit, to a third system associated with the second person, the information concerning the activity;
  receive, from the third system, a first response to the activity by the second person;
  determining whether the first response is an acceptance to the activity by the second person;
  based on a determination that the first response is an acceptance to the activity by the second person:
  transmit, to the second system, a first notice indicating that the second person has accepted the activity;
  determine one or more physical conditions of the second person using one or more sensor means on the third computing device, the one or more physical conditions of the second person represented in first sensor data relating to the activity
  analyze the first sensor data to determine whether the condition of the reward is satisfied, where the condition of the reward is a specific amount of exercise indicated by the one or more physical conditions; and
  based on a determination that the condition of the reward is satisfied;
  transmit, to the second system and the third system, a second notice indicating that the condition of the reward has been satisfied;
  receive, from the third system, second sensor data relating to the reward, where the reward is a specified amount of game playing time and the second sensor data indicates a portion of the specified amount that has been used;
analyze the second sensor data to determine whether the reward is consumed; and
based on a determination that the reward is consumed, transmit, to the second system and the third system, a third notice indicating that the reward has been consumed.

10. The first system of claim 9, wherein the processor is further operable when executing the instructions to:
based on the determinations that the first response is an acceptance to the activity by the second person and that the condition of the reward is satisfied:
receive, from the second system, an authorization to the reward by the first person; and
transmit, to the third system, a third notice indicating that the reward has been authorized.

11. The first system of claim 9, wherein the processor is further operable when executing the instructions to:
based on the determination that the first response is a first modification to the activity by the second person:
transmit, to the second system, the first modification;
receive, from the second system, a second response to the first modification by the first person;
determine whether the second response is an acceptance to the first modification by the first person; and
based on a determination that the second response is an acceptance to the first modification by the first person:
transmit, to the third system, a third notice indicating that the first person has accepted the first modification;
receive, from the third system, the first sensor data relating to the activity;
analyze the first sensor data to determine whether the condition of the reward is satisfied; and
based on a determination that the condition of the reward is satisfied, transmit, to the second system and the third system, the second notice indicating that the condition of the reward has been satisfied.

12. The first system of claim 9, wherein the processor is further operable when executing the instructions to:
based on the determination that the first response is a first modification to the activity by the second person:
transmit, to the second system, the first modification;
receive, from the second system, a second response to the first modification by the first person;
determine whether the second response is a second modification to the first modification by the first person; and
based on a determination that the second response is a second modification to the first modification by the first person, transmit, to the third system, the second modification.

13. The first system of claim 9, wherein the processor is further operable when executing the instructions to:
based on the determination that the first response is a first modification to the activity by the second person:
transmit, to the second system, the first modification;
receive, from the second system, a second response to the first modification by the first person;
determine whether the second response is a rejection to the first modification by the first person; and
based on a determination that the second response is a rejection to the first modification by the first person, transmit, to the third system, a third notice indicating that the first person has rejected the first modification.

14. The first system of claim 9, wherein the processor is further operable when executing the instructions to:
determine whether the first response is a rejection to the activity by the second person; and
based on a determination that the first response is a rejection to the activity by the second person, transmit, to the second system, a third notice indicating that the second person has rejected the activity.

15. The first system of claim 9, wherein the information concerning the activity further describes a punishment associated with the activity and a condition of the punishment.

16. The first system of claim 15, wherein the processor is further operable when executing the instructions to:
based on the determination that the first response is an acceptance to the activity by the second person:
analyze the first sensor data to determine whether the condition of the punishment is satisfied; and
based on a determination that the condition of the punishment is satisfied, transmit, to the second system and the third system, a third notice indicating that the condition of the punishment has been satisfied.

17. A computer-readable non-transitory storage media embodying software operable when executed by a first computer system to:
receive, from a second computer system associated with a first person, information specified by the first person concerning an activity, the information describing the activity, a reward associated with the activity, a condition of the reward, and a second person associated with the activity;
transmit, to a third computer system associated with the second person, the information concerning the activity;
receive, from the third computer system, a first response to the activity by the second person;
determine whether the first response is an acceptance to the activity by the second person; and
based on a determination that the first response is an acceptance to the activity by the second person:
transmit, to the second computer system, a first notice indicating that the second person has accepted the activity;
determine one or more physical conditions of the second person using one or more sensor means on the third computing device, the one or more physical conditions of the second person represented in first sensor data relating to the activity;
analyze the first sensor data to determine whether the condition of the reward is satisfied, where the condition of the reward is a specific amount of exercise indicated by the one or more physical conditions; and
based on a determination that the condition of the reward is satisfied:
transmit, to the second computer system and the third computer system, a second notice indicating that the condition of the reward has been satisfied;
receive, from the third computer system, second sensor data relating to the reward, where the reward is a specified amount of game playing time and the second sensor data indicates a portion of the specified amount that has been used;
analyze the second sensor data to determine whether the reward is consumed; and based on a determination that if the reward is consumed, transmit, to the second computer system and the third computer system, a third notice indicating that the reward has been consumed.

18. The media of claim 17, wherein the software is further operable when executed by the first computer system to:
based on the determinations that the first response is an acceptance to the activity by the second person and that the condition of the reward is satisfied:
receive, from the second computer system, an authorization to the reward by the first person; and
transmit, to the third computer system, a third notice indicating that the reward has been authorized.

19. The media of claim 17, wherein the software is further operable when executed by the first computer system to:
determine whether the first response is a first modification to the activity by the second person; and
based on a determination that the first response is a first modification to the activity by the second person:
transmit, to the second computer system, the first modification;
receive, from the second computer system, a second response to the first modification by the first person; and
determine whether the second response is an acceptance to the first modification by the first person;
based on a determination that the second response is an acceptance to the first modification by the first person:
transmit, to the third computer system, a third notice indicating that the first person has accepted the first modification;
receive, from the third computer system, the first sensor data relating to the activity;
analyze the first sensor data to determine whether the condition of the reward is satisfied; and
based on a determination that the condition of the reward is satisfied, transmit, to the second computer system and the third computer system, the second notice indicating that the condition of the reward has been satisfied.

20. The media of claim 17, wherein the software is further operable when executed by the first computer system to:
determine whether the first response is a first modification to the activity by the second person; and
based on a determination that the first response is a first modification to the activity by the second person:
transmit, to the second computer system, the first modification;
receive, from the second computer system, a second response to the first modification by the first person; and
determine whether the second response is a second modification to the first modification by the first person;
based on a determination that the second response is a second modification to the first modification by the first person, transmit, to the third computer system, the second modification.

21. The media of claim 17, wherein the software is further operable when executed by the first computer system to:
determine whether the first response is a first modification to the activity by the second person; and
based on a determination that the first response is a first modification to the activity by the second person:
transmit, to the second computer system, the first modification;
receive, from the second computer system, a second response to the first modification by the first person; and
determine whether the second response is a rejection to the first modification by the first person;
based on a determination that the second response is a rejection to the first modification by the first person, transmit, to the third computer system, a third notice indicating that the first person has rejected the first modification.

22. The media of claim 17, wherein the software is further operable when executed by the first computer system to:
determine whether the first response is a rejection to the activity by the second person; and
based on a determination that the first response is a rejection to the activity by the second person, transmit, to the second computer system, a third notice indicating that the second person has rejected the activity.

23. The media of claim 17, wherein the information concerning the activity further describes a punishment associated with the activity and a condition of the punishment.

24. The media of claim 23, wherein the software is further operable when executed by the first computer system to:
based on the determination that the first response is an acceptance to the activity by the second person:
analyze the first sensor data to determine whether the condition of the punishment is satisfied;
based on a determination that the condition of the punishment is satisfied, transmit, to the second computer system and the third computer system, a third notice indicating that the condition of the punishment has been satisfied.

* * * * *